United States Patent [19]
Horiuchi

[11] Patent Number: 5,837,999
[45] Date of Patent: Nov. 17, 1998

[54] POSITION DETECTING DEVICE HAVING A LINE SENSOR WHOSE LENGTH IS SHORTER THAN A DISTANCE BETWEEN TWO LIGHT BEAMS SIMULTANEOUSLY GENERATED BY AN ENCODING MEMBER

[75] Inventor: Tatsumi Horiuchi, Hachioji, Japan

[73] Assignee: Konica Corporation, Tokyo, Japan

[21] Appl. No.: 751,813

[22] Filed: Nov. 19, 1996

[30] Foreign Application Priority Data

Nov. 22, 1995 [JP] Japan ................................. 7-304584

[51] Int. Cl.⁶ ....................................................... G01D 5/34
[52] U.S. Cl. ............................... 250/231.14; 250/231.16; 341/13
[58] Field of Search ........................ 250/231.13, 231.14, 250/231.16, 231.18; 341/13, 31; 356/376

[56] References Cited

U.S. PATENT DOCUMENTS 4,475,086 10/1984 Allen .................................. 250/231.14
4,518,859 5/1985 Hoshika ............................. 250/231.14
5,254,919 10/1993 Bridges et al. ..................... 250/231.16

*Primary Examiner*—Stephone B. Allen
*Attorney, Agent, or Firm*—Frishauf, Holtz, Goodman, Langer & Chick

[57] ABSTRACT

In an apparatus for detecting a movement of an encoding member capable of generating simultaneously two light beams which are spaced with a predetermined distance therebetween and which move in synchronization with the movement of the encoding member, a line sensor faces the encoding member such that the two light beams move alternately on the line sensor. The line sensor has a length shorter than the distance between the two light beams so that the line sensor receives a single light beam and outputs position information corresponding to a moving position of the received light beam on the line sensor. A detector detects the movement of the encoding member on the basis of the position information output by the line sensor.

15 Claims, 10 Drawing Sheets

POSITION DETECTING DEVICE HAVING A LINE SENSOR WHOSE LENGTH IS SHORTER THAN A DISTANCE BETWEEN TWO LIGHT BEAMS SIMULTANEOUSLY GENERATED BY AN ENCODING MEMBER

BACKGROUND OF THE INVENTION

The present invention relates to an encoding device, and more particularly to a technology to improve resolution with respect to the sensing of a position.

Optical sensors which sense position of a material and movement speed include a rotary encoder type device and a linear encoder type device. Conventional encoder devices are composed of an encoding plate having slits through which light can be transmitted formed at regular intervals, an illuminant source which irradiates light toward aforesaid slits on the encoding plate and a light-receiving unit, which is located facing the illuminant source and which senses light from the illuminant source through the encoding plate, wherein light from the illuminant source is intermittently irradiated on the light-receiving unit due to slits separately formed on the encoding plate and, on the other hand, pulses are outputted synchronously with the intermittent light sensed by the light-receiving unit when the encoding plate rotates or moves corresponding to the movement of the material. In addition, by differentiating aforesaid pulse with time, speed can be obtained.

Incidentally, as the light-receiving element in aforesaid light-receiving unit, a point sensor is ordinarily used, wherein "on" and "off" of the light from the illuminant source is only sensed.

However, in a conventional encoding device, in the case of the rotary encoder, the slits must be the same in number as resolution in one rotation of the encoding plate. In the case of the linear encoder, the slits must be the same in number as resolution necessary in the whole movable range. For example, in the case of the rotary encoder, in order to obtain resolution of 10,000 pulses/rotation, it was necessary to provide 10,000 slits per one rotation of the encoding plate. However, in practice, it is difficult to form such a high number of slits.

On the other hand, in addition to the above-mentioned sensing methods using separate slits, there is also known a method to sense a position wherein two sine wave signal whose phase are shifted by 90° from each other are sensed from different positions using an encoding plate in which the transmittive rate of slits is continuously changed in a sine wave form and the position is sensed by aforesaid sine wave signals using interpolation processing In this sensing method, high accuracy is necessary for the sensitivity of the light-receiving element and the form of slits in order to change analogously the light amount falling onto the light-receiving unit.

Incidentally, in an image forming apparatus such as a printer and a copying machine which necessitate resolution of 300–600 dpi, it is necessary to position at an accuracy of 40–80 μm against the total paper size in an image forming unit of aforesaid image forming apparatus. In practice, sensing a position against a prescribed whole range while keeping aforesaid high accuracy has been difficult using the above-mentioned conventional techniques, so that reduction of sensing accuracy could not be avoided.

SUMMARY OF THE INVENTION

Accordingly, in view of the above-described conventional problems, an objective of the present invention is to provide an encoding device capable of improving resolution corresponding to the number of slits formed on the encoding plate by up to 100 times.

The present invention for attaining the above-mentioned objective is an encoding device which senses a light pulse from an encoding plate synchronous with the movement of the encoding plate and which also senses the movement of the encoding plate, having the first one-dimensional light receiving means which is located approximately parallel in movement direction of the encoding plate, which senses the position of the light pulse entering at a narrower range compared to the interval of the light pulse adjoining and which outputs aforesaid positional information and a sensing means which senses the movement of the above-mentioned encoding plate based on positional information from the above-mentioned first one-dimensional light-receiving means.

Here, "movement of the encoding plate" means position and speed of the encoding plate, and relative movement speed and the movement distance (position) between the encoding plate and the light-receiving means.

In addition, "light pulse" means light from the encoding plate. It is light entering onto the one-dimensional light-receiving means at a prescribed interval synchronous with the movement of the encoding plate. For example, as described later, it means a reflective light wherein light from the illuminant source positioned on the one-dimensional light-receiving means reflects by a reflection unit provided on the encoding plate or a transmitting light wherein light from the illuminant source positioned on the opposite side from one-dimensional. light-receiving means transmits holes (light-transmitive window) provided on the encoding plate.

Incidentally, the degree of "approximately parallel" means that the light pulse falls on the one-dimensional light-receiving means within sensing range of the one-dimensional light-receiving means.

Due to the above-mentioned structure, since positional information of the light pulse from the encoding plate can be sensed due to the first one-dimensional light-receiving means, movement of the encoding plate can be sensed with high accuracy. In addition, by arranging sensing of the position of the entering light pulse to be conducted at a narrower range compared to the interval of the adjoining light-pulse, for example, by arranging the sensing range of the one-dimensional light-receiving means to be wider that the interval of the adjoining light pulse, the irradiation of plural light pulses on a single one-dimensional light-receiving element concurrently can be prevented so that erroneous sensing of the position of light pulse can be prevented.

In addition, the present invention comprises an encoding device which senses light pulses from the encoding plate synchronous with the movement of the encoding plate and which also senses the movement of the encoding plate having the above-mentioned encoding plate wherein the light amount of at least one light pulse is different from that of the other light pulse, a light-receiving means which senses the light amount of entering light pulse and a position sensing means which senses that the above-mentioned encoding plate reaches a prescribed position based on the light amount sensed by the above-mentioned light-receiving means.

Due to the above-mentioned structure, when the light amount of light pulse sensed by the light-receiving means is different from the light amount of the other light pulse, by sensing that the encoding plate reaches a prescribed position, an absolute position of the encoding plate with aforesaid position as the standard can be sensed.

The above-mentioned light-receiving means, which is located approximately parallel to the movement direction of the encoding plate, is the first one-dimensional light-receiving means which outputs aforesaid positional information wherein the position of the entering light pulse is sensed at narrower range compared to the interval of light pulse. Aforesaid light-receiving means has a sensing means which senses the movement of the above-mentioned encoding plate, based on positional information from the above-mentioned first one-dimensional light-receiving means.

Due to the above-mentioned structure, positional information of light pulse is sensed by the first one-dimensional light-receiving means. In addition, adjoining light pulses are prevented from being simultaneously irradiated to a single one-dimensional light receiving element. Accordingly, positional information of light pulse can be sensed accurately, and movement of the encoding plate can be sensed with high accuracy.

When the above-mentioned first one-dimensional light-receiving means is not sensing a light pulse, an interpolation means interpolates movement of the above-mentioned encoding plate so that the above-mentioned sensing means senses movement of the above-mentioned encoding plate, based on positional information sensed immediately before from the above-mentioned first one-dimensional light-receiving means and information from the above-mentioned interpolation means.

Due to the above-mentioned structure, even when a light pulse is not irradiated on the first one-dimensional light-receiving means, a position of the light pulse can be calculated to an area where the light pulse is not sensed by interpolating movement of the encoding plate so that movement of the encoding plate can be sensed without interval.

The above-mentioned interpolation means is a means which obtains interpolation information based on immediate before movement of the encoding plate sensed by positional information from the above-mentioned first one-dimensional light-receiving means.

Due to the above-mentioned structure, even when the position of light pulse is not sensed, based on movement characteristics of the encoding plate sensed by positional information from one-dimensional light-receiving means, movement of the encoding plate can be calculated continuously without interval by operation.

The above-mentioned interpolation means, which outputs positional information corresponding to the position of the entering light pulse, is a second one-dimensional light-receiving means which is provided in connection with the first one-dimensional light-receiving means and which is separate from aforesaid first one-dimensional light-receiving means.

Due to the above-mentioned structure, by the use of two one-dimensional light-receiving means, when one of two one-dimensional light-receiving means cannot senses light pulse, the other one-dimensional light-receiving means can directly sense aforesaid light pulse. Accordingly, sensing accuracy of the position of light pulse is improved so that movement of encoding plate can be sensed continuously without interval and with high accuracy.

The above-mentioned first one-dimensional light-receiving means and the above-mentioned second one-dimensional light-receiving means are located in such a manner that end of the above-mentioned first one-dimensional light-receiving means and end of the above-mentioned second one-dimensional light-receiving means overlap in the movement direction of light pulse. In addition, the interval of adjoining light pulses is set to be longer than a sensing range of the above-mentioned first one-dimensional light-receiving means and the above-mentioned second one-dimensional light-receiving means respectively and shorter than the sensing range on the effective light-receiving surface included between the above-mentioned first one-dimensional light-receiving means and the above-mentioned second one-dimensional light-receiving means.

Due to the above-mentioned structure, by positioning the above-mentioned first one-dimensional light-receiving means and the above-mentioned second one-dimensional light-receiving means in such a manner that an end of both means overlap each other, the length of composed effective light-receiving surface is substantially extended so that light pulses are always irradiated on the effective light-receiving surface. In addition, adjoining light pulses are not irradiated in the sensing range of a single light pulse concurrently. Accordingly, positional information of the light pulse can be sensed continuously and stably with high accuracy.

When positional information from the above-mentioned first one-dimensional light-receiving means reaches a prescribed value, the above-mentioned sensing means switches positional information from the above-mentioned first one-dimensional light-receiving means and information from the above-mentioned interpolation means so that movement of the encoding plate is sensed.

Due to the above-mentioned structure, by switching positional information from the above-mentioned first one-dimensional light-receiving means and information from the above-mentioned interpolation means to use, when outputting of positional information in the case that light pulse is irradiated on the end of one-dimensional light-receiving means become instable, the positional information of the light pulse can be sensed by the interpolation means not using outputting from aforesaid one-dimensional light-receiving means. Therefore, movement of the encoding plate can be sensed accurately.

When the positional information from the above-mentioned first one-dimensional light-receiving means and the information from the above-mentioned interpolation means are switched, the above-mentioned sensing means adds information immediately before being switched and then senses the movement of the encoding plate.

Due to the above-mentioned structure, when the positional information from the above-mentioned first one-dimensional light-receiving means and the information from the above-mentioned interpolation means are switched, by adding information immediately before being switched to information after being switched, the occurrence of error of positional information due to switching can be prevented so that movement of the encoding plate can be sensed continuously without interval.

The above-mentioned encoder device has a light irradiation means which irradiates light toward the above-mentioned encoding plate. The above-mentioned encoding plate has a light transmitting hole by which light irradiated from the above-mentioned light irradiating means is caused to transmit light for preparing light pulse or a reflective member by which light irradiated from the above-mentioned light irradiation means is reflected for preparing light pulse.

Due to the above-mentioned structure, by irradiating light toward the encoding plate by the light irradiating means, light pulse obtained through the encoding plate and the reflected light from the reflection member can always be sensed stably. Therefore, movement of the encoding plate can surely be sensed.

An optical means for causing light irradiated from the above-mentioned light irradiation means to be parallel light is provided in front of the above-mentioned light irradiation means.

Due to the above-mentioned structure, by causing light irradiated from the above-mentioned light irradiation means to be parallel light, movement between the encoding plate and light pulse coincides so that movement of the encoding plate can be sensed with higher accuracy.

The above-mentioned one-dimensional light-receiving means has position sensing device PSD.

Due to the above-mentioned structure, positional information of light pulse can be sensed with simple and inexpensive structure so that measurement resolution can further be improved.

The above-mentioned first one-dimensional light-receiving means has a CCD or an MOS.

Due to the above-mentioned structure, positional information of light pulse can be continuously sensed due to simple and inexpensive structure. Concurrently with this, in the case of the CCD, positional information corresponding to the light strength distribution of light pulse can be sensed. On the other hand, in the case of the MOS, light pulse can be sensed more stably.

The above-mentioned encoding plate is either a disc moving corresponding to the movement of the material or a band-shaped plate moving forward and backward corresponding to the movement of material.

Due to the above-mentioned structure, in the case of a disc, rotation movement of the encoding plate can be sensed. In the case of the band-shaped plate, forward or backward movement of the encoding plate can be sensed.

The above-mentioned material is a photoreceptor of an image forming apparatus or a movement optical system of an image reading apparatus.

Due to the above-mentioned structure, position control with high accuracy is possible. Therefore, deterioration of image quality derived from position shift such as color shift can be minimized.

DETAILED DESCRIPTION OF THE PREFERRED EMBODIMENT

Hereinafter, embodiments of the present invention will be explained referring to FIGS. 1–14.

Figure 1:
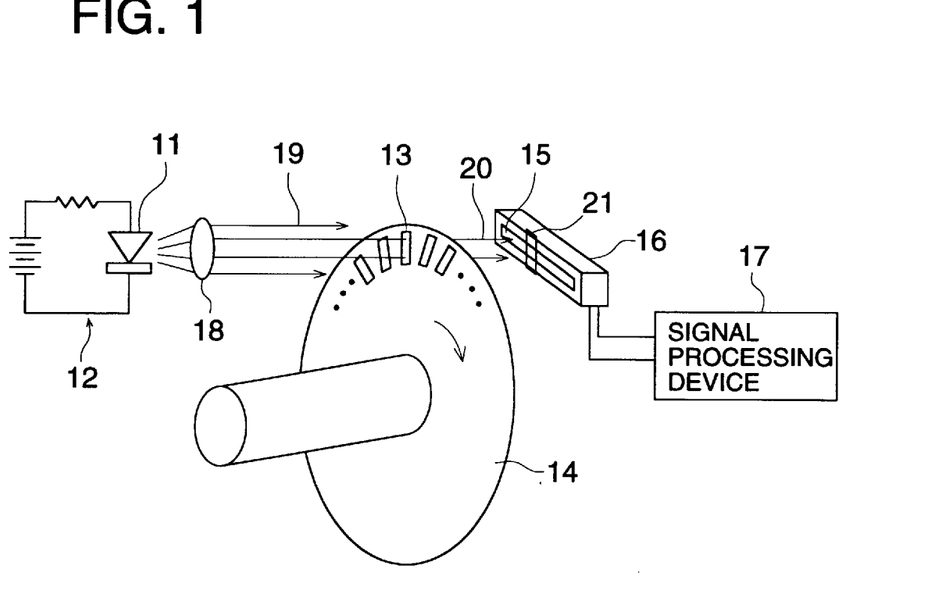
FIG. 1 is a block diagram showing a system composition of the first embodiment.

As shown in FIG. 1, the embodiment of the present invention comprises illuminnant source 12 including illuminant element 11 such as red or near infrared LED, tabular encoding plate 14 wherein a rotation shaft is connected to a rotation driving body and plural of rectangular slits are formed at a constant interval at the periphery direction all over the circumferential portion thereof, light receiving unit 16 wherein the longitudinal direction of PSD (Positional Sensitive Device) 15 coincides with the oscilation of the light pulse and signal processing device 17 which processes a signal outputted from aforesaid light receiving unit 16 and outputs information regarding location and speed.

Figure 2:
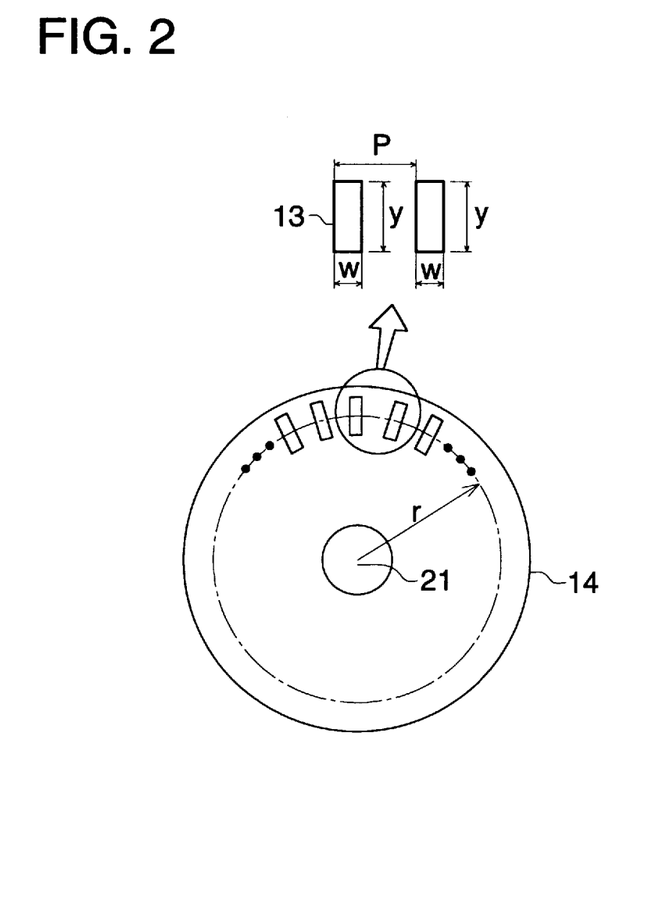
FIG. 2 is a drawing showing an encoding plate and slits in the first embodiment.

Next, effects of the above-mentioned encoder device will now be explained. Light from illuminance element 11 is irradiated onto encoding plate 14 as parallel light 19 produced by passing through convex lens 18. It is not illustrated though, for example, aforesaid encoding plate 14 is so structured as to be connected to the rotation shaft of the rotation body such as a photoreceptor of the image forming apparatus, wherein, as shown in FIG. 2, rectangular slits 13 having length y in a diameter direction and width w perpendicular to the diameter at a distance r from the center 21 of encoder plate are formed all through the circumference with interval P.

Heretofore, due to rotation of the encoding plate, light pulse was irradiated on the light receiving unit intermittently. Therefore, "on" or "off" of the light pulse was sensed to output the position signal. However, in the embodiment of the present invention, resolution of position sensing has been enhanced by sensing a position, by one light pulse, which moves due to the rotation of the encoding plate.

That is, due to rotation by aforesaid encoding plate 14, slits 13 successively appear on a line which connects illuminance 12 and light receiving unit 16. PSDs 15a and 15b respectively sense at what position projected light image 21 is irradiated on the light receiving surface of the PSD.

In this embodiment, PSD is used as one dimensional light receiving sensor. Since PSD is not a sensor like a CCD (charge coupled device) sensor or a MOS (metal oxide semiconductor) sensor in which a plurality of light receiving elements are aligned, PSD is not restricted by an arrangement of the plurality of light receiving elements so that high accuracy position detection can be attained by the PSD. Further, the detecting device can be made at low cost by using the PSD.

Figures 3A, 3B:
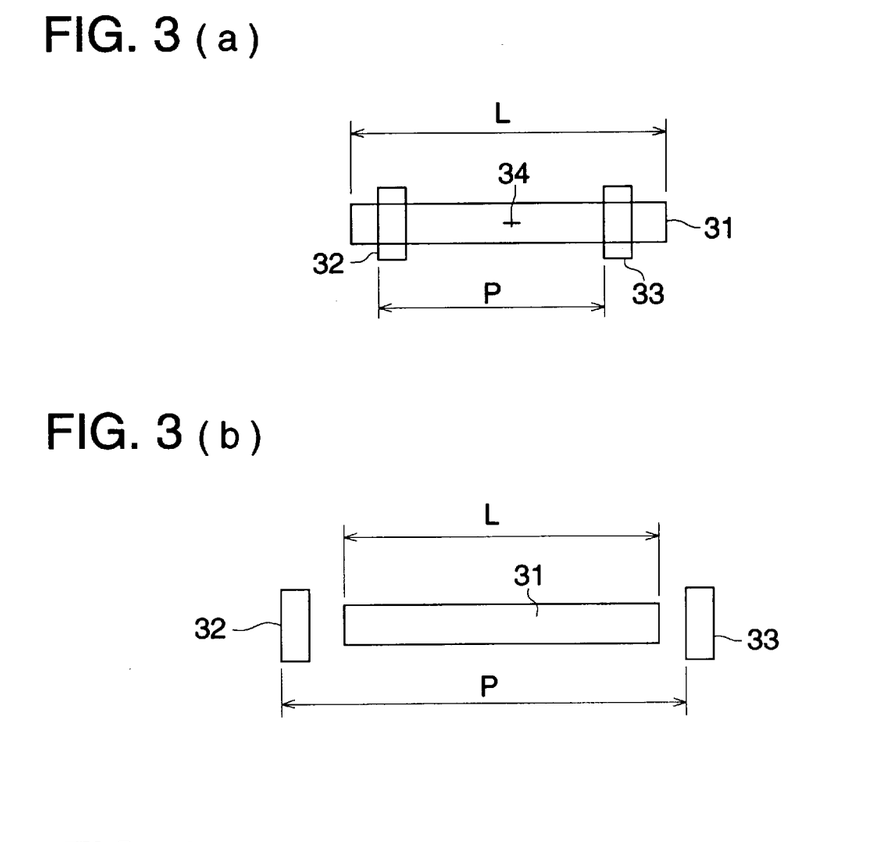
FIGS. 3(a) and 3(b) are drawings explaining relationship between the light-receiving surface on the one-dimensional light-receiving device and slits.

Aforesaid sensing device has, due to its sensing theory, properties such that position cannot correctly be sensed when light is irradiated at two or more places. If two light pulse 32 and 33 are irradiated inside the PSD's effective light receiving surface 31 as shown in FIG. 3, a signal corresponding to a position intermediate thereof is generated. In order to prevent the above-mentioned situation, length L (effective light receiving surface length) of the effective light receiving surface of the PSD is set to be shorter than interval P (hereinafter referred to as slit interval) of the slits on the encoding plate.

In order to irradiate the encoding plate by light from the illuminance unit as parallel light, the slit interval of the encoding plate should be equal to the interval of the light image projected on the light receiving portion and also the form of slits should be equal to the form of the light image. The aforesaid parallel light may be maintained in parallel only where the light passes the sensing area of the light pulse in the light receiving portion. The degree of the parallelity may be such that the light pulse is irradiated on the light receiving portion in the sensing area of the light receiving portion.

In addition, a simplified system wherein light from illuminance element 11 is irradiated on an encoding plate 14 as it is may be adopted. In such an occasion, even if encoding plate 14 rotates at a constant speed, moving speed of the light pulse changes depending upon the position of light receiving surface of the PSD. However, if the change of speed is measured in advance and the inverse function is used, amendment is possible.

However, when the parallel light is used, it is not necessary to use the above-mentioned measurement nor inverse function. Therefore, practically, it is preferable to use the parallel light. Further, it is also preferable to lengthen the irradiation range of aforesaid parallel light compared to the length of the PSD.

Figure 4:
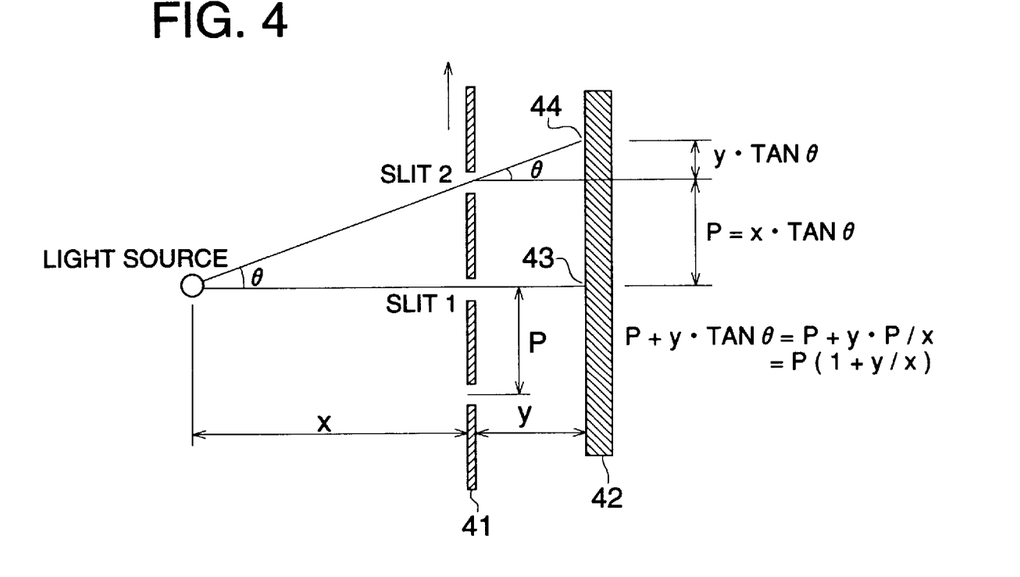
FIG. 4 is a drawing explaining amount of movement of light image on the one-dimensional light-receiving device following movement of the encoding plate.

In FIG. 4, suppose that encoding plate 41 moves in an arrowed direction by ΔP. In this occasion, light image 43 on PSD light receiving surface 42 formed by slit 1 moves in an arrowed direction by about ΔP. Light image 44 of slit 2 moves in an arrowed direction by ΔP(1+y/x). Light image 44 of slit 2 excessively moves by ΔP·y/x compared with light image 43 of slit 1.

Incidentally, in the embodiment of the present example, effective light receiving length L of the PSD is set shorter than slit P of the encoding plate. Accordingly, as shown in FIG. 3(b), timing when the light pulse is not completely irradiated on effective light receiving surface 31 occurs so that measurement-impossible time when the position of the light pulse cannot be sensed occurs.

Aforesaid measurement-impossible time can be sufficiently shortened compared to measurement-possible time when the light image exists inside the effective light-receiving surface by setting effective light-receiving surface length L which is a sensing range of the light pulse slightly shorter compared to slit interval P which is an interval of the light pulse adjoining. Therefore, by providing a position signal immediately before the occurrence of the decrease signal of light amount with operation processing wherein change property is added to the time of the positional signal memorized by each unit time, continuous interpolation positional signal is caused to be measured.

Incidentally, since aforesaid interpolation processing is not necessary unless there is information that the encoding plate is moving (for example, information that a motor is rotating), it shall be conducted that aforesaid information is obtained.

Figure 5:
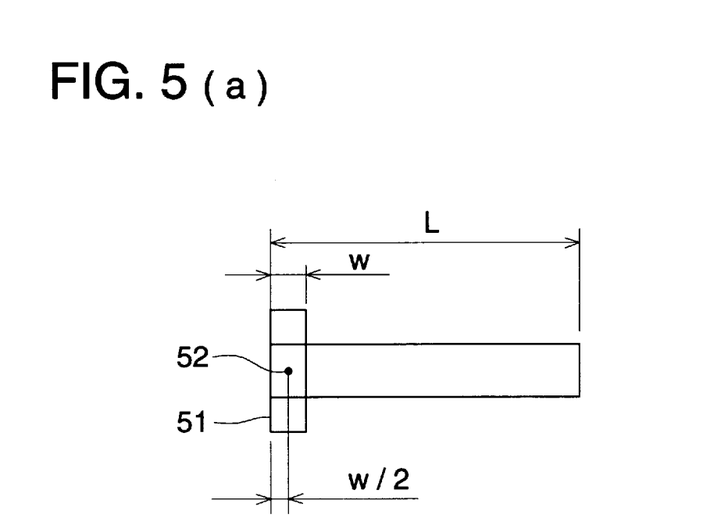
FIGS. 5(a) and 5(b) are drawings explaining region where light pulse cannot be measured.

Suppose that slit width is w, a position where the light image can be sensed at high accuracy is a position w/2 from a position where the entire light image enters into the effective light receiving surface from the left end of the effective light receiving surface as shown in FIG. 5(a), i.e., enter 52 of light image 51 is located at w/2 from the left end of the effective light receiving surface until a position w/2 immediately before protruding from the right end of the effective light receiving portion, i.e., center 53 of light image 51 is w/2 from the right end of the light receiving surface, namely, with the left side of the PSD as the benchmark, from w/2 to "L−w/2".

Here, if slit interval P is set to be longer than the sum of effective light receiving length L and slit width w as shown in the following equation (1) and slit width is set as shown in the following equation (2), $$P = 1.01(L+w) \quad (1)$$

$$w = L/20 \quad (2)$$

LN, which is a length incapable of being measured, can be represented by equation (3).

$$LN = P-(L-w) \approx 0.11 \quad (3)$$

Namely, LN, which is a length incapable of being measured, is about 11%.

Next, practical effects of the embodiment of the present example will now be explained referring to FIGS. 6 and 7.

Figure 6:
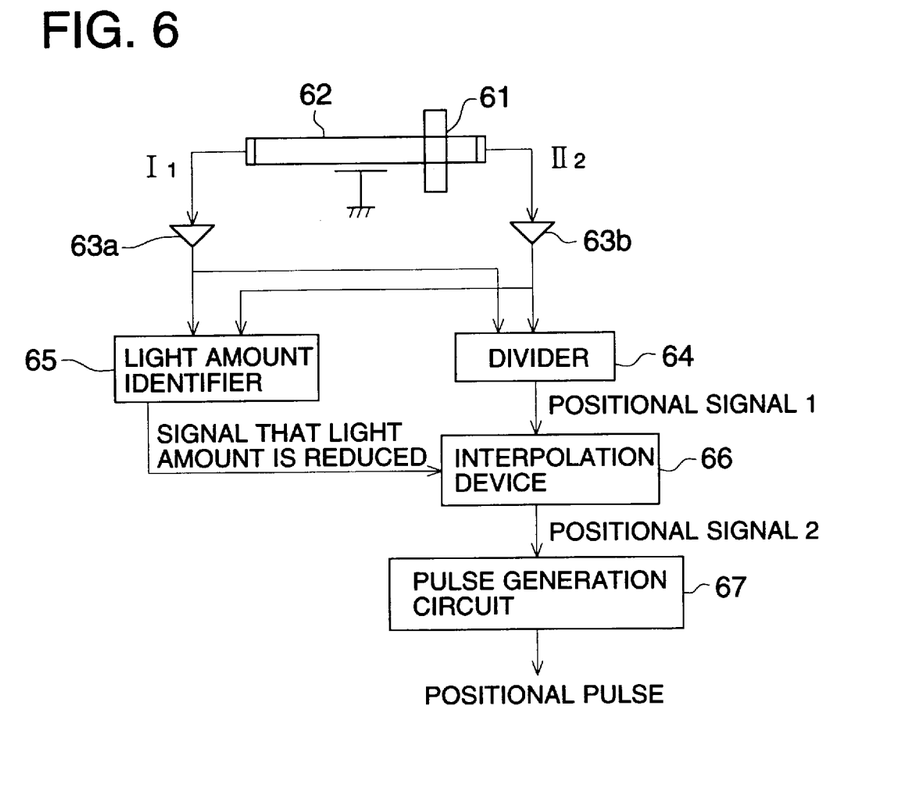
FIG. 6 is a system block diagram in the first embodiment.
Figure 7:
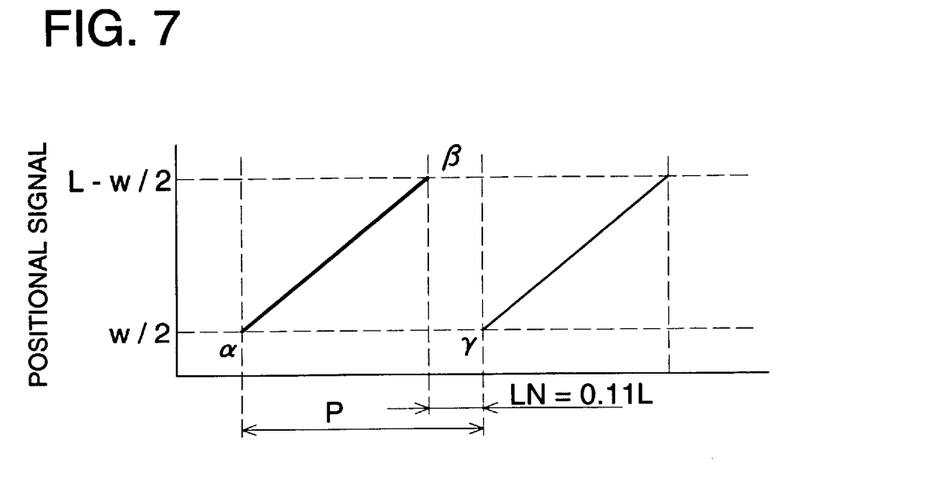
FIG. 7 is a drawing showing a positional signal from one PSD.

As shown in FIG. 6, the embodiment of the present example is constituted of single PSD 62 for sensing light image 61 of the light pulse amplifiers 63a and 63b which amplifies electrical current obtained from the left end and the right end of PSD62, divider 64 which converts each of the amplified electrical current to positional signals, light amount judger 65 which judges that the light amount of the light pulse from each of electrical current is lower than a prescribed value, interpolation device 66 which interpolates positional signal 1 obtained from divider 64 and pulse generation circuit 67 which generates positional pulse from positional signal 2 obtained by interpolation device 66.

Electrical currents $I_1$ and $I_2$ from both end of PSD 62 is amplified by amplifier 63a and 63b. Each of the amplified electrical current is subjected to A/D conversion. Following this, $I_2/(I_1+I_2)$ is calculated by means of divider 64 for measuring positional signal 1. Due to this, as shown in FIG. 7, while the center of the light image is from w/2 to L−w/2 (between α−β), stable positional signal can be obtained.

On the other hand, whether or not the sum of the output of amplifiers 63a and 63b is at a prescribed value or less is judged by light amount judge 65. If it is at a prescribed value or less, the light amount reduction signal is sent to interpolation device 66. Namely, between β−γ as shown in FIG. 7 represents a case when the sum of the output of the above-mentioned amplifier is at a prescribed value or less. In this range, it is impossible to measure positional signals.

When the light amount decrease signal does not occur, interpolation device 66 outputs positional signal 1 as it is as positional signal 2, and concurrently with this, memorizes change properties of the positional signal against time. In addition, when the decrease signal occurs, the interpolation device generates the positional signal by interpolating a positional signal not to be measured based on change properties of the positional signal memorized as above, and outputs aforesaid positional signal as positional signal 2.

Aforesaid positional signal 2 is inputted into pulse generation circuit 67, and every time positional signal 2 increases by a prescribed value, it outputs one positional pulse.

As explained above, in the embodiment of the present example, when a positional signal cannot be measured, positional signals can be continuously be obtained by generating the positional signal by means of interpolation processing using the change properties of the positional signal measured in advance so that, with a simple structure, an area incapable of being measured can substantially be avoided. In addition, interpolation processing is conducted based on change properties of the positional signal immediately before when the positional signal cannot be obtained. Therefore, more accurate positional signal can be measured. Further, the area where interpolation is conducted is about 11% of the effective light receiving surface length of the PSD so that position sensing accuracy is not noticeably reduced.

Incidentally, in the embodiment of the present example, there is a possibility that position sensing accuracy is reduced when the encoding plate stops in a range where measurement is impossible or the encoding plate is reversed. However, there is no problem when the encoding plate does not rotate at a certain speed and thereby does not reverse itself as in the case of a driving apparatus of the image forming apparatus used for a printer or a copying machine.

In addition, FIG. 6 operate an analog signal by a divider and outputs the positional signal. One PSD may be used. Two PSD may be used. Both cases may be used. The total may be realized by a micro-processor provided with an A/D converter.

Next, the second embodiment wherein in order that position sensing by the light pulse can always sense, two one-dimensional light-receiving elements are placed in parallel so that the position of the light image of the light pulse is sensed will now be explained.

Figure 8:
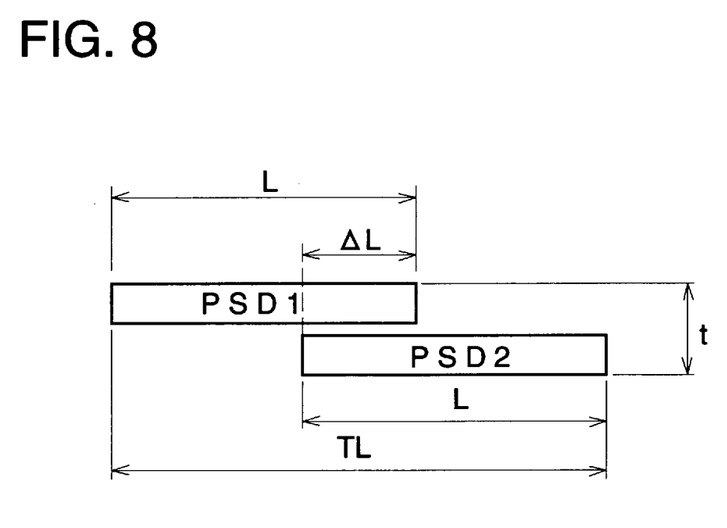
FIG. 8 is a drawing showing location of one-dimensional light-receiving device in the second embodiment.

Namely, in the first embodiment, measurement-impossible time wherein the position of light image cannot be sensed was subjected to interpolation processing by means of operation. However, the embodiment of the present invention is constituted to prevent the occurrence of the position sensing incapable time and to inpterpolate the portion wherein the position is incapable of being sensed by the first one-dimensional light-receiving element by sensing aforesaid position with the second one-dimensional light-receiving element. Namely, as shown in FIG. 8, two PSD is aligned in the moving direction of the light pulse, ajoining PSD are shifted each other perpendicular to the moving direction of the light pulse, end portions of each adjoining PSD are overlapped in the moving direction of the light pulse by $\Delta L$ and slit interval P of the encoding plate, slit length y and slit width w were set to satisfy the following equations (4) through (6).

$$L<P<TL \tag{4}$$

$$\Delta L<w \tag{5}$$

$$t<y \tag{6}$$

wherein TL represents the length of the effective light receiving surface of two PSD; and t represents the width of the effective light receiving surface combined.

By using the above-mentioned system wherein a position is directly sensed, sensing accuracy can further be improved compared to the operation interpolation processing system by the first embodiment. Hereinafter, the above-mentioned system will be explained in detail.

Figure 9:
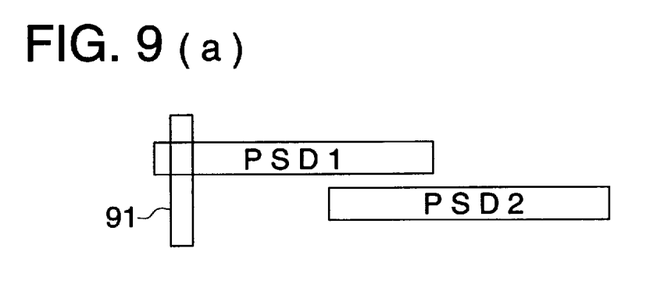
FIGS. 9(a) to 9(d) are drawings showing position relationship of light pulse compared to the light-receiving surface on two one-dimensional light-receiving device.

Due to that the light receiving unit is constituted of two PSD, the position of the light image in the light receiving unit can be categorized to four types as shown in (a)–(d) in FIG. 9. In any types, the position of light image 91 can be sensed, and concurrently with it, the occurrence of the above-mentioned measurement-incapable time can be prevented.

(a) The light image only exists on the effective light receiving surface of PSD1.
(b) The light image exists on a portion where PSD1 and PSD2 overlap.
(c) The light image only exists on the effective light receiving surface of PSD2.
(d) The light image only exists on the right end of the effective light receiving surface of PSD2, and new light image 92 only exists on the left end of the effective light receiving surface of PSD1.

Next, a method of sensing the position of light pulse using two PSD will now be explained referring to FIG. 10.

Figure 10:
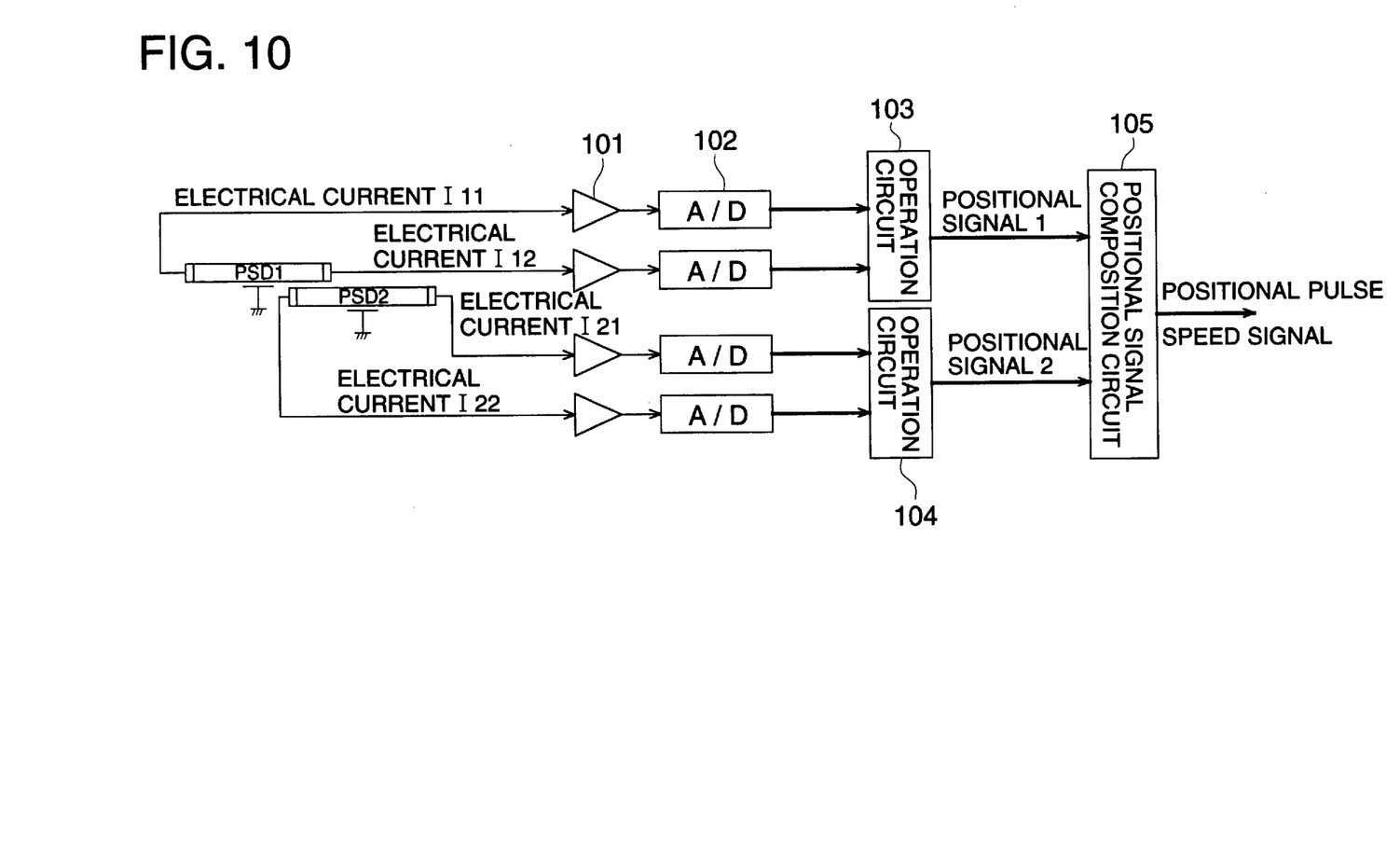
FIG. 10 is a system block diagram in the second embodiment.

In FIG. 10, electrical current $I_{11}$ obtained from the left end of PSD1 is amplified by amplifier 101, and then, converted to a digital signal in A/D converter 102. In the same manner, electrical current $I_{12}$ obtained from the right end of PSD1 is amplified by amplifier 101, and then, converted to a digital signal. Incidentally, it is desirable that aforesaid A/D conversion has resolution of 10 bit or more (0 V is 0 and 0.5 V is 1023).

The above-mentioned digital signal is inputted in operation circuit 103. If the sum of two digital signal is smaller than a prescribed value (for example, 100), the denominator of division becomes smaller so that accuracy is extremely reduced in an analogu operator or in a division circuit after being converted to the digital signal. Accordingly, value 1023 is outputted as positional signal 1, judging that the light image of the light pulse does not exist on the light receiving surface. When the value is the same or more than the prescribed value, $I_{12}/(I_{11}+I_{12})$ is calculated and the resulting value is outputted as positional signal 1. The positional signal is ranged between 0–1. However, for processing simplification, aforesaid value is defined to be an integer between 0–1000. Including the value of 1023 when the light image does not exist, aforesaid value shall be a 10 bit digital value.

Similarly, electrical currents $I_{21}$ and $I_{22}$ from PSD2 are also amplified by the amplifier. Following this, they are converted to digital signals. If the sum of two digital signals from operation circuit 104 is smaller than a prescribed value (for example, 100), 1023 is outputted as positional signal 2. If the value is the same or more than the prescribed value, $I_{22}/(I_{21}+I_{22})$ is calculated, and the resulting numeral is outputted as positional signal 2.

By inputting the resulting positional signals 1 and 2 in positional signal synthesizing circuit 105, positional pulse and speed signal are outputted depending upon the change amount of positional signal. If the value of the positional signal is 1023, it is determined that the light image of the light pulse does not exist in the effective light receiving surface of the PSD corresponding to its positionA1 signal.

Figure 11:
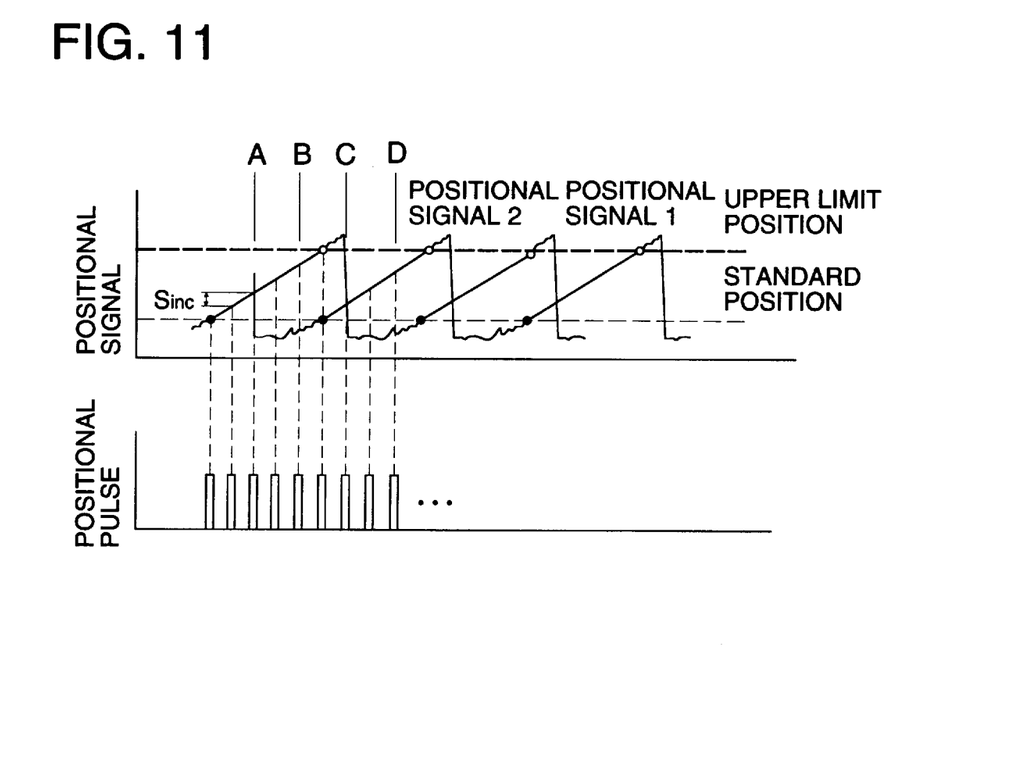
FIG. 11 is a drawing showing a positional signal from two PSDs and positional pulse.

Now, procesing of positional signals 1 and 2 depending upon situation shown in FIGS. 9(a)–(d) will be expalined one by one. First, in the case when light image 91 of the light pulse exists only on PSD 1 as shown in FIG. 9(a), as shown in FIG. 11, positional signal 1 from the PSD 1 outputs one positional pulse every time aforesaid positional signal 1 increases a preascribed step amount $S_{inc}$ (for example, 10) (between A and B).

In the case when light image 91 irradiates a portion where PSD 1 and PSD 2 overlap as shown in FIG. 9(b), if positional signal 1 is smaller than the upper limit position, a positional pulse is outputted using positional signal 1, and if positional signal 1 is larger than the upper limit position, the positional pulse is outputted using positional signal 2 (between B–C).

Increased increment since positional signal 1 finally outputted the positional pulse until positional signal 2 arrives at the standard position is succeeded by positional signal 2 by adding to positional signal 2. For example, after the positional pulse is outputted when positional signal is 800, when positional signal 2 arrives at the standard position when 805 is counted, positional signal 2 is added 5 which is an increased increment of positional signal 1 so that it starts counting from 105 (since the standard position is 100), and outputs the positional pulse when arriving at 110.

When light image 91 exists on PSD 2 as shown in FIG. 9(*c*), the positional pulse is generated in accordance with the increase of positional signal 2 from PSD 2.

When, concurrently with that light image 91 shifts to the right end of PSD 2, new light image 92 enters the left end of PSD 1, if positional signal 1 is smaller than the standard position, the positional pulse is outputted using positional signal 2, and if positional signal 1 is larger than the standard position, the positional pulse is outputted using positional signal 1 (between C–D).

In the same manner as in the case of between B–C, increased increment since positional signal 2 finally outputted the positional pulse until positional signal 1 arrives at the standard position is succeeded by positional signal 1 by adding to positional signal 1.

Due to switching signals as above, influence of mounting error of PSD 1 and PSD 2 and shift of slit pitch of the encoding plate can be removed. Concurrently with this, the positional pulse can be occurred continuously and depending upon the change of the positional signal in the course that light pulse image moves from PSD1 to PSD2.

In addition, by sensing the positional time at a prescribed time interval, timewise change of the positional signal can be measured and it can be outputted as speed signal.

Figure 12:
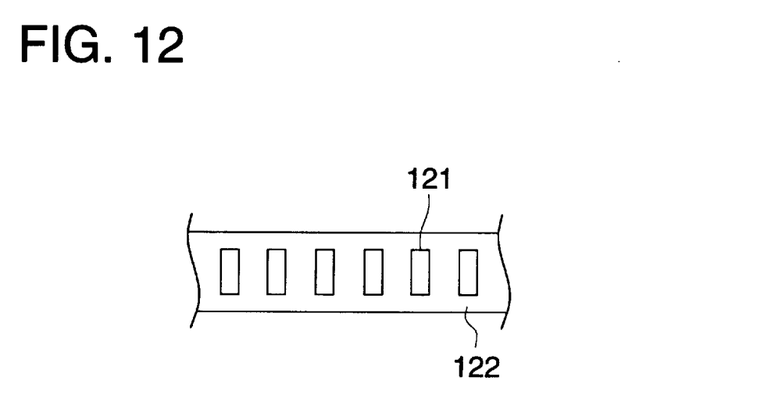
FIG. 12 is a drawing showing a band-shaped encoding plate.

The encoding plate of the embodiment of the present example may directly or indirectly be mounted on an object of which position or speed will be sensed as band-shaped encoding plate 122 wherein alit hole 121 is formed at a constant interval as shown in FIG. 12.

In addition, an A/D converter and an operation circuit may obtain similar effects even when they are used one by one by the use of a alternative switch. Signal processing devices such as the A/D converter, the operation circuit and a positional signal synthesis circuit may be substituted by a micro-processor and a software. Further, in the case when the encoder device in the embodiment of the present example is applied to an image forming apparatus, a part of the micro-processor for image forming apparatus control may be utilized for signal processing.

As described above, by arranging two one-dimensional light receiving elements parallelly and by switching aforesiad one-dimensional light receiving elements alternatively depending upon the condition of the irradiated position of the light pulse, the occurrence of measurement-impossible time wherein positional signal of the light pulse can be prevented. Even during switching the above-mentioned one-dimensional light receiving element, positional pulse is continuously generated so that position-sensing accuracy having several to 100 times resolution compared to resolution corresponding to the number of slits can be obtained.

Mechanical parts such as the encoding plate are not necessary to have specifically high accuracy. By arranging the illuminance section, light receiving section and the encoding plate as a single unit, they are easily built in another unit separately. By changing the step amount $S_{inc}$ of the positional signal which obtains the occurrence timing of positional pulse and the number of bit in A/D converting, resolution can freely be selected so that targeted sensing accuracy can easily be obtained.

FIG. 10 shows an example in which operation is conducted after the positional signal is converted to a digital signal using the A/S converter. In this example, both cases wherein one PSD is used and two PSDs are used may be used. The whole processes may be arranged as a microprocessor with the A/D converter.

In addition, although the PSD has been described as a one-dimensional element, an array wherein a CCD or MOS and light receiving elements are arranged may also be used.

Figure 13:
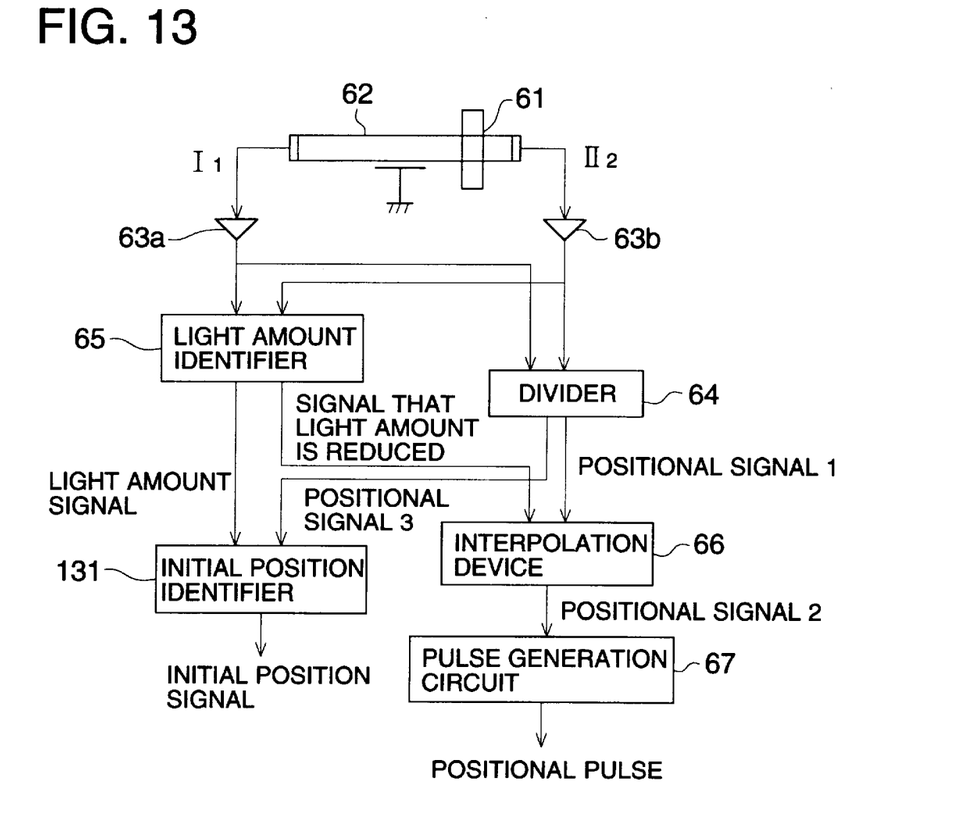
FIG. 13 is a system block diagram in the third embodiment.

Next, the third embodiment wherein initial position is sensed by sensing light amount in the second embodiment will now be explained. Structure of this embodiment is that initial position identifier 131 is added to the first embodiment. The second embodiment may be provided with aforesaid initial position identifier.

Effects of aforesaid initial position identifier 131 will now be explained. In this embodiment, by changing the transmissive rate of light against a specific slit of the encoding plate, the light amount of the light pulse changes. Accordingly, by sensing light amount of aforesaid light pulse, aforesaid initial position identifier outputs an initial position signal showing that it is the initial position.

Figure 14:
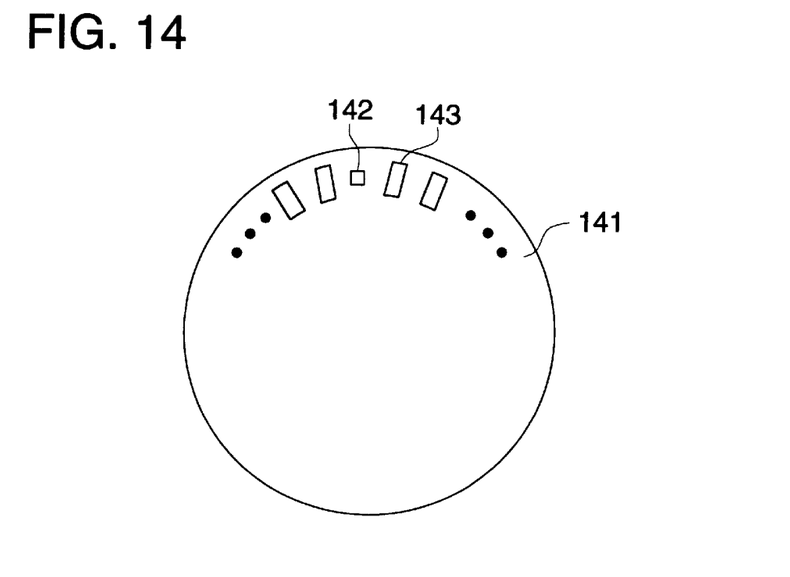
FIG. 14 is a drawing showing an encoding plate wherein the degree of transmissivity of specific slits are changed.

For example, by changing an opening area of specific slit 142 on encoding plate 141 as shown in FIG. 14, the transmissive rate is changed. For example, if the transmissive rate of specific slit 142 is set to be 50% of the transmissive rate of the other slits 143, the electrical current value outputted from the PSD is decreased to 50%. In addition, amplified electrical current value inputted to light amount identifier 105 also becomes about 50% of the electrical current value to the other slits.

By identifying whether it is light pulse from the above-mentioned specific slit judging from the above-mentioned electrical current value, namely, the light amount, an initial point signal may be occurred.

However, if it is judged only by means of the change of the light amount merely, the above-mentioned specific slit may erroneously be sensed, since the light amount may be reduced in a case the light image is out of the effective light receiving surface, when the light image of the light pulse positions at the end of the effective light receiving surface of the PSD.

Accordingly, it has been arranged that the positional information of the light image is simultaneously be judged when the light amount is judged. Namely, positional signal 3 sensed by divider 104 so that an erroneous signal that it is not the initial point is occurred when the light image positions at the end of the light receiving element. Concurrently with this, when the light image positions within the effective light receiving surface length other than the end portion and when the light amount signal from light amount identifier 105 is changed, the initial point signal that it is an initial point is outputted.

Incidentally, one slit which changes the transmittive rate of light may be provided on the encoding plate so that one initial point signal is outputted with one encoding plate rotation. In addition, plural slits which change the transmittive rate may be provided so that plural initial point signal (the standard point signal) may be outputted with one encoding plate rotation.

Further, by changing the light transmittive rate of slit stepwisely such as 25%, 50% and 75%, an absolute positional signal corresponding to slits may be outputted.

Due to aforesaid structure, an absolute movement amount of the material may be sensed. Therefore, how much the material moved from the standard position can easily be sensed.

In addition, the first and third embodiments conduct digital signal processing, and the second processing conducts analog signal processing. Each embodiment, however, can process both digital signals and analog signals.

As explained above, according to the present invention, concurrently with positional information of a light pulse being sensed by the first one-dimensional light receiving means, an adjoining light pulse is prevented from irradiating the first one-dimensional light-receiving element. Therefore, movement of the encoding plates can be sensed with high accuracy, while preventing erroneous sensing of the position of light pulse.

In addition, according to the present invention, the encoding plate arriving at a prescribed position can be sensed by a light amount of the light pulse sensed by the light receiving means. Based on this, an absolute position of the encoding plate can be sensed.

The first one-dimensional light-receiving means can sense positional information about the light pulse. Concurrently with this, adjoining light pulses are prevented from being simultaneously irradiated. Accordingly, positional information of the light pulse can be sensed more accurately and the movement of the encoding plate can be sensed with high accuracy.

Even if the irradiating position by the light pulse is out of the one-dimensional light-receiving means so that positional information is not sensed by the one-dimensional light-receiving means, the position of the light pulse can be measured by subjecting the movement of the encoding plate to interpolation processing so that movement of the encoding plate can continuously be sensed without interval.

By the use of two one-dimensional light-receiving means, when light pulse cannot be sensed by means of one of the one-dimensional light-receiving means, aforesaid light pulse can be sensed accurately by means of the other one-dimensional light-receiving element. Thus, movement of the encoding plate can continuously be sensed without interval and with high accuracy.

By arranging the first one-dimensional light-receiving means and the second one-dimensional light-receiving means while end of both means are overlapped, the length of the effective light receiving surface is substantially extended so that light pulse can always be irradiated on the composed effective light receiving surface. As a result, positional information cannot be sensed wherein adjoining light pulses are irradiated within the sensed range of one one-dimensional light-receiving element and a light pulse is prevented from being irradiated in the composed effective light-receiving surface, so that positional information of the light pulse can be continuously sensed stably with high accuracy.

Due to switching positional information on the one-dimensional light-receiving means and information from the interpolation means, positional information of the light pulse can be sensed by means of interpolation means so that movement of the encoding plate can be sensed more accurately and so that an area where outputting of positional information becomes unstable if not used.

Due to adding information immediately before switching positional information from the one-dimensional light-receiving means and information from the interpolation means to information after switching, the occurrence of shift of positional information due to switching can be prevented, and movement of the encoding plate can be sensed more accurately.

Due to irradiating light onto the encoding plate by the light irradiating means, a light pulse obtained through the encoding plate or a reflected light from the reflection member can constantly be sensed, Accordingly, movement of the encoding plate can surely be sensed.

Due to arranging light from light irradiating means as parallel light, movement of the encoding plate and movement of light pulse can coincide with each other so that movement of the encoding plate can be sensed with high accuracy.

Due to the above-described simplified and inexpensive structure, positional information of light pulse can continuously be sensed so that measurement resolution can further be improved.

In addition, in the case of the CCD, position information corresponding to light strength distribution of light pulse can be sensed, and in the case of the MOS, light pulse can be sensed stably.

In the case of a circular plate, rotation movement of the encoding plate can be sensed, and in the case of a band-shaped plate, forward movement of the encoding plate can be sensed.

According to the present invention, positional control with high accuracy can be conducted, and deterioration of image quality derived from position shift such as color shift can be minimized.

What is claimed is:

1. An apparatus comprising:
    an encoding member which is capable of simultaneously producing two light beams which are spaced with a predetermined distance therebetween and which move in synchronization with a movement of the encoding member;
    a line sensor facing the encoding member so that the two light beams move alternately on the line sensor, the line sensor having a length shorter than the predetermined distance between the two light beams so that the line sensor receives only one of the two light beams and outputs position information corresponding to a moving position of the received one of the two light beams on the line sensor; and
    a detector for detecting the movement of the encoding member based on the position information output by the line sensor.

2. The apparatus of claim 1, further comprising interpolating means for interpolating the movement of the encoding member and for outputting interpolating information when the line sensor receives no light beam, wherein the detector detects the movement of the encoding member based on the interpolating information output by the interpolating means and the position information output by the line sensor just before the line sensor receives no light beam.

3. The apparatus of claim 2, wherein the interpolating means includes means for calculating the interpolating information based on the movement of the encoding member detected from the position information of the line sensor just before the line sensor receives no light beam.

4. The apparatus of claim 2, wherein the detector switches from detecting the movement of the encoding member based on the position information output by the line sensor to detecting the movement of the encoding member based on the interpolating information output by the interpolating means when the position information of the line sensor becomes a predetermined level.

5. The apparatus of claim 4, wherein when the detector switches from detecting the movement of the encoding member based on the position information output by the line sensor to detecting the movement of the encoding member based on the interpolating information output by the interpolating means, the detector adds the interpolating information and the position information just before switching and detects the movement of the encoding member based on the added information.

6. The apparatus of claim 1, wherein two line sensors are placed in parallel along the moving direction of the two light beams so that a length of an effective light receiving surface of the two line sensors is longer than the predetermined distance between the two light beams.

7. The apparatus of claim 6, wherein a second one of the two line sensors comprises interpolating means for outputting position information when a first one of the two line sensors receives no light beam.

8. The apparatus of claim 6, wherein the detector switches from detecting the movement of the encoding member based on position information output by the first line sensor to detecting the movement of the encoding member based on position information output by the second line sensor when the position information output by the first line sensor becomes a predetermined level.

9. The apparatus of claim 1, further comprising a light source for generating light, and wherein the encoding member comprises one of a plate having holes through which the light generated by the light source passes to produce the two light beams and a plate provided with a light reflecting member to reflect the light generated by the light source to produce the two light beams.

10. The apparatus of claim 9, wherein the plate comprises one of a disk rotating synchronously with a movement of an object and a web-shaped plate linearly moving synchronously with the movement of the object.

11. The apparatus of claim 10, wherein the object comprises one of a photoreceptor of an image forming apparatus and a moving optical system of an image reading device.

12. The apparatus of claim 9, wherein the light source comprises an optical light source which forms parallel light.

13. The apparatus of claim 1, wherein the line sensor comprises a position sensitive device.

14. An apparatus comprising:

an encoding member for producing a light beam and for changing a light amount of the light beam in accordance with a moving position;

a sensor for receiving the light beam from the encoding member and for detecting a light amount of the light beam;

a detector for detecting whether the encoding member arrives at a predetermined position based on the light amount of the light beam detected by the sensor.

15. The apparatus of claim 14, wherein:

the encoding member simultaneously produces two light beams which are spaced with a predetermined distance therebetween and which move in synchronization with a movement of the encoding member, the sensor comprises a line sensor facing the encoding member so that the two light beams move alternately on the line sensor, the line sensor having a length shorter than the predetermined distance between the two light beams so that the line sensor receives only one of the two light beams and outputs position information corresponding to a moving position of the received one of the two light beams on the line sensor, and the detector detects the movement of the encoding member based on the position information output by the line sensor.

\* \* \* \* \*